(12) United States Patent
Radovich et al.

(10) Patent No.: US 11,411,278 B2
(45) Date of Patent: Aug. 9, 2022

(54) POWER TOOL AND BATTERY PACK FOR USE WITH THE SAME

(71) Applicant: MILWAUKEE ELECTRIC TOOL CORPORATION, Brookfield, WI (US)

(72) Inventors: Kyle J. Radovich, West Bend, WI (US); James P. Elfering, Antioch, IL (US); Zoe L. Hinton, Milwaukee, WI (US); Terry L. Timmons, Oconomowoc, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 231 days.

(21) Appl. No.: 16/801,771

(22) Filed: Feb. 26, 2020

(65) Prior Publication Data

US 2020/0280033 A1    Sep. 3, 2020

Related U.S. Application Data

(60) Provisional application No. 62/812,738, filed on Mar. 1, 2019.

(51) Int. Cl.
*H01M 50/24*        (2021.01)
*B25F 5/02*         (2006.01)
(Continued)

(52) U.S. Cl.
CPC ............ *H01M 50/24* (2021.01); *B25F 5/02* (2013.01); *H01M 50/213* (2021.01);
(Continued)

(58) Field of Classification Search
None
See application file for complete search history.

(56) References Cited

U.S. PATENT DOCUMENTS 4,645,278 A * 2/1987 Yevak, Jr. ............ H01R 13/447
                                                     228/212
6,304,058 B2   10/2001 Watson et al.
(Continued)

FOREIGN PATENT DOCUMENTS

DE        3121883 C1    1/1983
DE    102012203938 A1   4/2013
(Continued)

OTHER PUBLICATIONS

International Search Report and Written Opinion for Application No. PCT/US2020/019862 dated Jun. 29, 2020 (10 pages).

*Primary Examiner* — Gregg Cantelmo
(74) *Attorney, Agent, or Firm* — Michael Best & Friedrich LLP

(57) ABSTRACT

A battery pack for use with a power tool and including a housing having an internal cavity in which one or more battery cells are supported. The housing has a set of openings. A printed circuit board is supported within the housing and in electrical communication with the battery cells. Battery pack contacts are coupled to and in electrical communication with the printed circuit board. A terminal block is supported by the printed circuit board and encloses the battery pack contacts. Each of the battery pack contacts are accessible through one of the set of openings in the housing and the terminal block. A first gasket is positioned between a first wall of the terminal block and the housing and a second gasket is positioned between a second wall of the terminal block and the printed circuit board.

20 Claims, 10 Drawing Sheets

(51) Int. Cl.
*H01M 50/213* (2021.01)
*H01M 50/247* (2021.01)
*H01M 50/284* (2021.01)
*H01M 50/296* (2021.01)
*H01M 50/242* (2021.01)

(52) U.S. Cl.
CPC ....... *H01M 50/242* (2021.01); *H01M 50/247* (2021.01); *H01M 50/284* (2021.01); *H01M 50/296* (2021.01); *H01M 2220/30* (2013.01)

(56) References Cited

U.S. PATENT DOCUMENTS

| | | | |
|---|---|---|---|
| 6,329,788 | B1 | 12/2001 | Bailey, Jr. et al. |
| 6,536,536 | B1 * | 3/2003 | Gass .................. B23B 31/123 173/171 |
| 6,537,694 | B1 | 3/2003 | Sugiura et al. |
| 7,211,347 | B2 | 5/2007 | Sugiura et al. |
| 7,343,683 | B2 | 3/2008 | Buck et al. |
| 7,423,407 | B2 | 9/2008 | Watson et al. |
| 7,598,705 | B2 | 10/2009 | Watson et al. |
| 7,618,741 | B2 | 11/2009 | Casalena et al. |
| 7,799,448 | B2 | 9/2010 | Cruise et al. |
| 7,944,174 | B2 | 5/2011 | Casalena et al. |
| 8,278,877 | B2 | 10/2012 | Murayama et al. |
| 8,383,263 | B2 | 2/2013 | Cruise et al. |
| 8,624,552 | B2 | 1/2014 | Murayama et al. |
| 8,765,280 | B2 | 7/2014 | Ueda et al. |
| 8,895,182 | B2 | 11/2014 | Hanawa et al. |
| 9,236,588 | B2 | 1/2016 | Hanawa et al. |
| 9,368,765 | B2 | 6/2016 | Taga |
| 9,502,669 | B2 | 11/2016 | Murayama et al. |
| 9,614,387 | B2 | 4/2017 | Cruise et al. |
| 10,076,340 | B2 | 9/2018 | Belagali et al. |
| 2006/0087283 | A1 | 4/2006 | Phillips et al. |
| 2009/0274948 | A1 | 11/2009 | Calderone |
| 2012/0003522 | A1 * | 1/2012 | Fuhr .................. H01M 10/643 429/120 |
| 2014/0295257 | A1 | 10/2014 | Harada |
| 2015/0200485 | A1 | 7/2015 | Yu et al. |
| 2015/0214520 | A1 | 7/2015 | Nishikawa et al. |
| 2017/0170605 | A1 | 6/2017 | Cruise et al. |
| 2018/0184861 | A1 | 7/2018 | Brown et al. |
| 2018/0366697 | A1 | 12/2018 | Elfering et al. |

FOREIGN PATENT DOCUMENTS

| | | | |
|---|---|---|---|
| EP | 2565956 A1 | 3/2013 | |
| JP | 2013012441 A | 1/2013 | |
| KR | 20170030070 A1 | 3/2017 | |
| WO | 2014049926 A1 | 4/2014 | |
| WO | WO-2018112454 A2 * | 6/2018 | .......... H01M 50/267 |

* cited by examiner

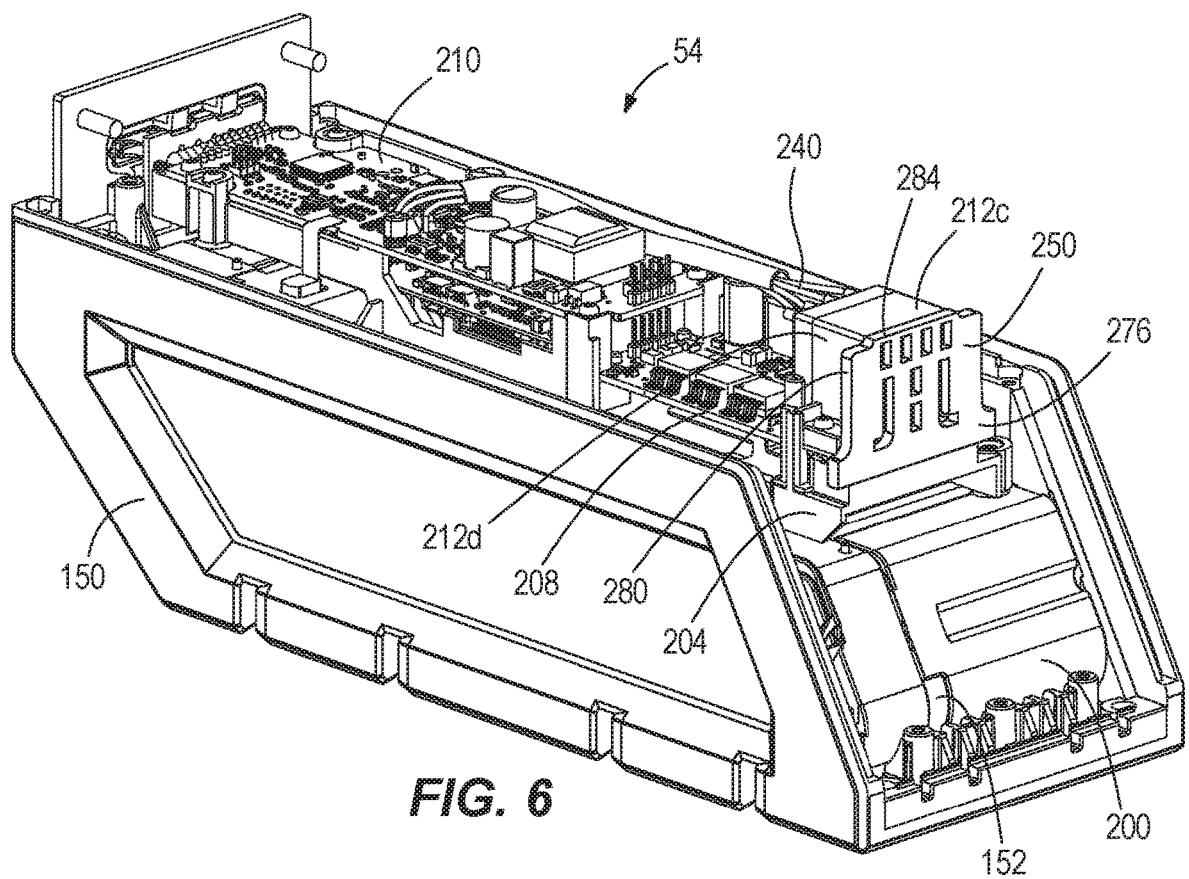
FIG. 6
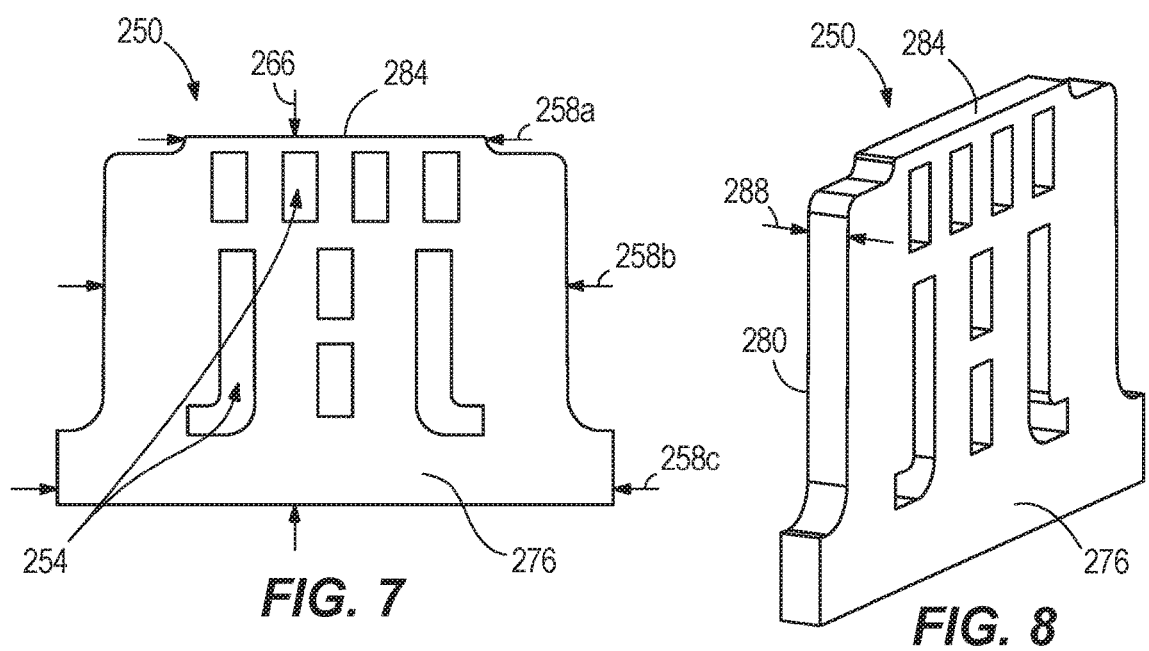
FIG. 7
FIG. 8

POWER TOOL AND BATTERY PACK FOR USE WITH THE SAME

CROSS-REFERENCE TO RELATED APPLICATIONS

This application claims priority to U.S. Provisional Patent Application No. 62/812,738 filed on Mar. 1, 2019, the entire contents of which are incorporated herein by reference.

BACKGROUND

The present invention relates to electric devices (e.g., power tools) and a battery for use with electric devices.

It is important to the health of a power tool and a battery pack for use with a power tool to prevent water and other debris from infiltrating the same. Water and other debris can result in deterioration of the internal components of the power tool and the battery pack.

SUMMARY

In one embodiment a power tool system is disclosed. The power tool system includes a power tool that has a housing with a battery-receiving portion that removably receives a battery pack, and device contacts supported by the housing. The device contacts are configured to mechanically and electrically interface with the battery pack. The battery pack includes a housing that has an internal cavity in which one or more battery cells are supported and a set of openings. A frame member is positioned within the housing. A printed circuit board is supported within the housing by the frame member, and the battery cells are in electrical communication with the printed circuit board. Battery pack contacts are coupled to and in electrical communication with the printed circuit board, and each of the battery pack contacts are accessible through one of the set of openings in the housing. A terminal block is supported by the printed circuit board and encloses the battery pack contacts. The battery pack contacts are accessible through a first wall of the terminal block. A first gasket is positioned between a first wall of the terminal block and the housing, and the first gasket has a surface that abuts the first wall and at least a portion of the frame member. A second gasket is positioned between a second wall of the terminal block and the printed circuit board.

In another embodiment a battery pack for use with a power tool is disclosed. The battery pack includes a housing having an internal cavity in which one or more battery cells are supported and a set of openings. A printed circuit board is supported within the housing, and the battery cells are in electrical communication with the printed circuit board. Battery pack contacts are coupled to and in electrical communication with the printed circuit board, and each of the battery pack contacts are accessible through one of the set of openings in the housing. A terminal block is supported by the printed circuit board and encloses the battery pack contacts. The terminal block includes a wall having a first set of openings, and each of the openings in wall correspond to one of openings in the housing. A gasket is positioned between the first wall of the terminal block and the housing. The gasket includes a set of openings, and each of the openings corresponds to one of the openings in the housing of the battery pack and one of the set of openings in the terminal block.

In another embodiment a battery pack for use with a power tool is disclosed. The battery pack includes a housing having an internal cavity in which one or more battery cells are supported and a set of openings. A printed circuit board is supported within the housing, and the battery cells are in electrical communication with the printed circuit board. Battery pack contacts are coupled to and in electrical communication with the printed circuit board. A terminal block is supported by the printed circuit board and encloses the battery pack contacts. Each of the battery pack contacts are accessible through one of the set of openings in the housing and the terminal block. A first gasket is positioned between a first wall of the terminal block and the housing. The first gasket includes a first surface, a second surface that is opposite the first surface, and a third surface. The first surface is in contact with a first surface of the housing, the second surface is in contact with the wall of the terminal block, and the third surface is in contact with a second surface of the housing. A second gasket is positioned between a second wall of the terminal block and the printed circuit board.

Other aspects of the invention will become apparent by consideration of the detailed description and accompanying drawings.

BRIEF DESCRIPTIONS OF THE DRAWINGS

FIG. 6 is a perspective view of the battery pack shown in FIG. 5 with a portion of the housing removed and showing a first gasket.

FIG. 7 is a front view of the first gasket of FIG. 6.

FIG. 8 is a perspective view of the first gasket of FIG. 6.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

DETAILED DESCRIPTION OF THE DRAWINGS

Figure 1:
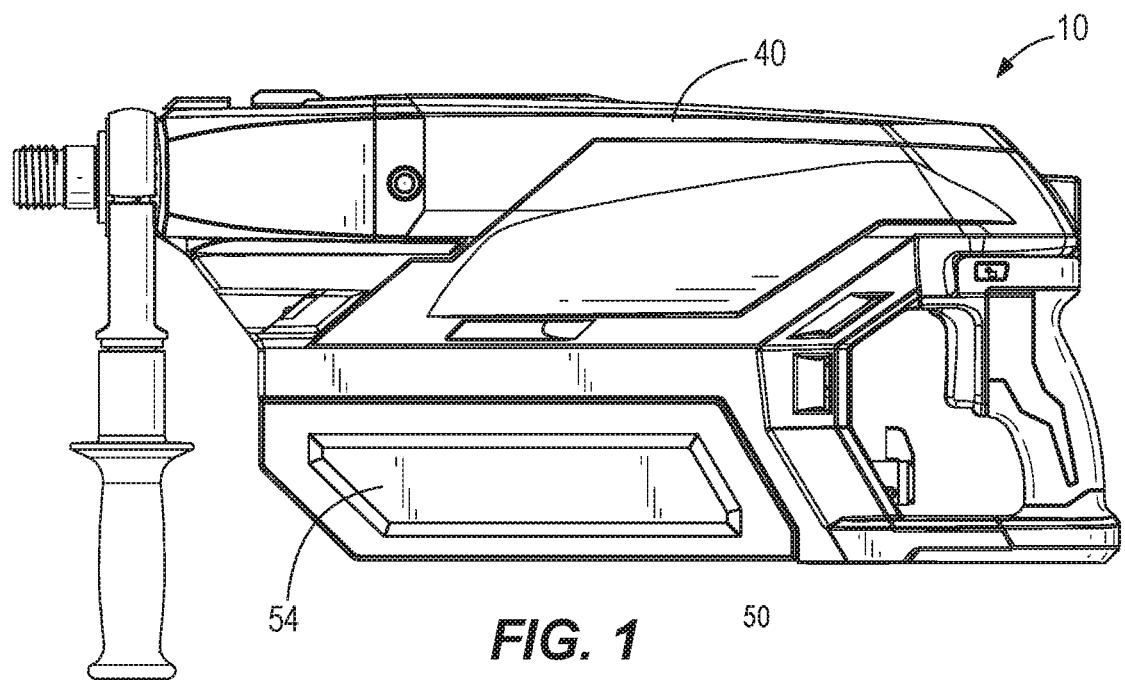
FIG. 1 is a side view of a battery pack coupled to an electric device having a battery-receiving portion.

FIG. 1 illustrates an electric device 10 configured to receive a battery pack 54 (e.g., a rechargeable lithium-ion battery pack). In the illustrated embodiment, the electric device is a drill, but the electric device may be any type of power tool, an outdoor tool, or a non-motorized device (e.g., a light, an audio device, etc.).

Figure 2:
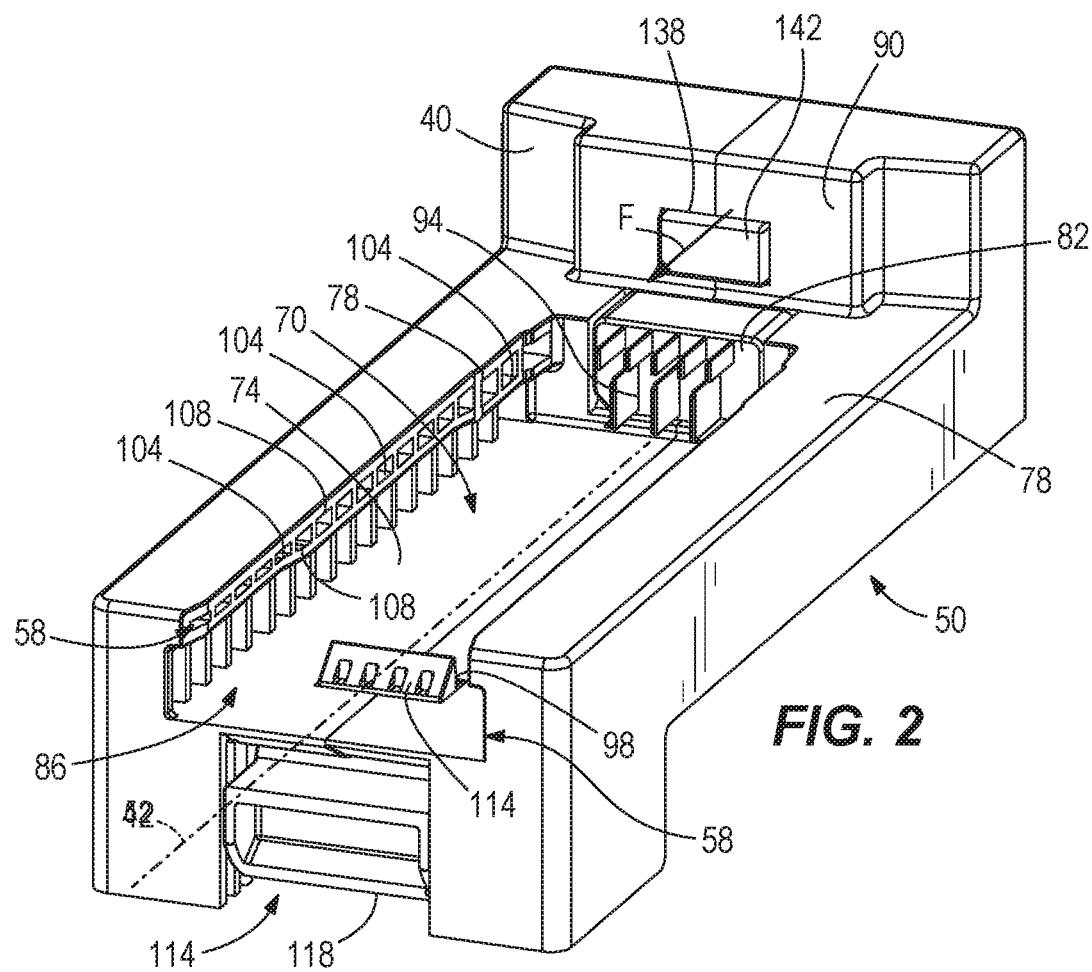
FIG. 2 is a perspective view of the battery-receiving portion shown in FIG. 1 including electric device terminals.

With reference to FIGS. 1 and 2, the electric device includes a housing 40 including a battery-receiving portion 50 that defines a longitudinal axis 52 (i.e., battery insertion axis) and has a cavity 70 defined by a lower surface 74, a pair of sidewalls 78, and an end wall 82. An open end 86 is opposite the end wall 82. In addition, an upper end wall 90 extends above the end wall 82 proximate the cavity 70. Device contacts 94 are supported on the end wall 82 and are configured to mechanically and electrically interface with the battery pack 54 to transfer electrical power therebetween.

Figure 3:
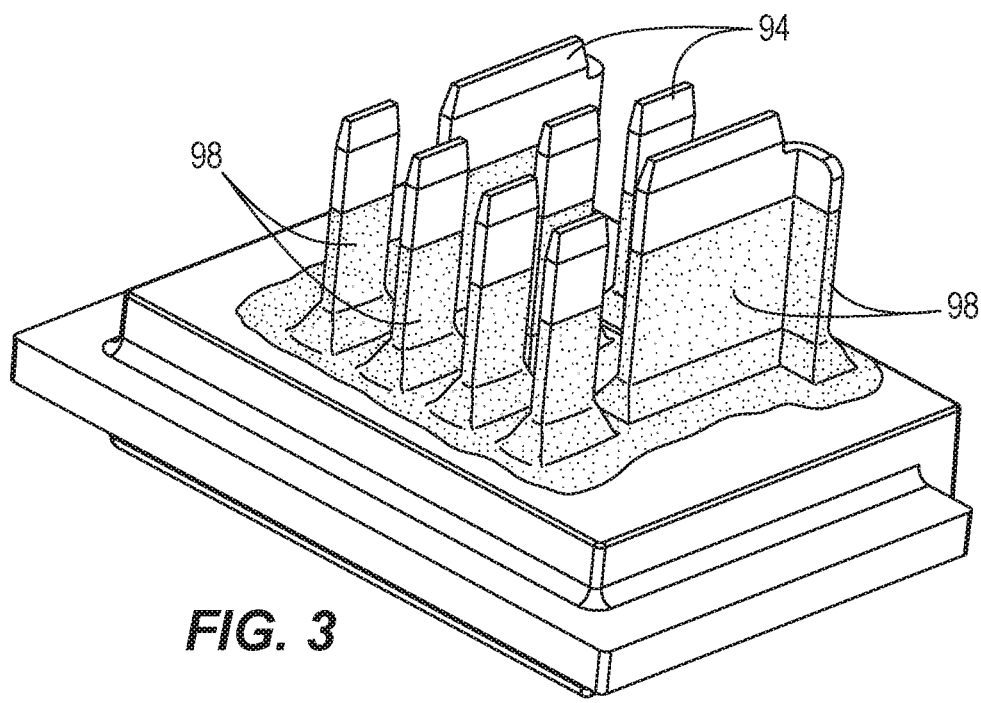
FIG. 3 is a perspective view the electric device terminals of FIG. 2.
Figure 4:
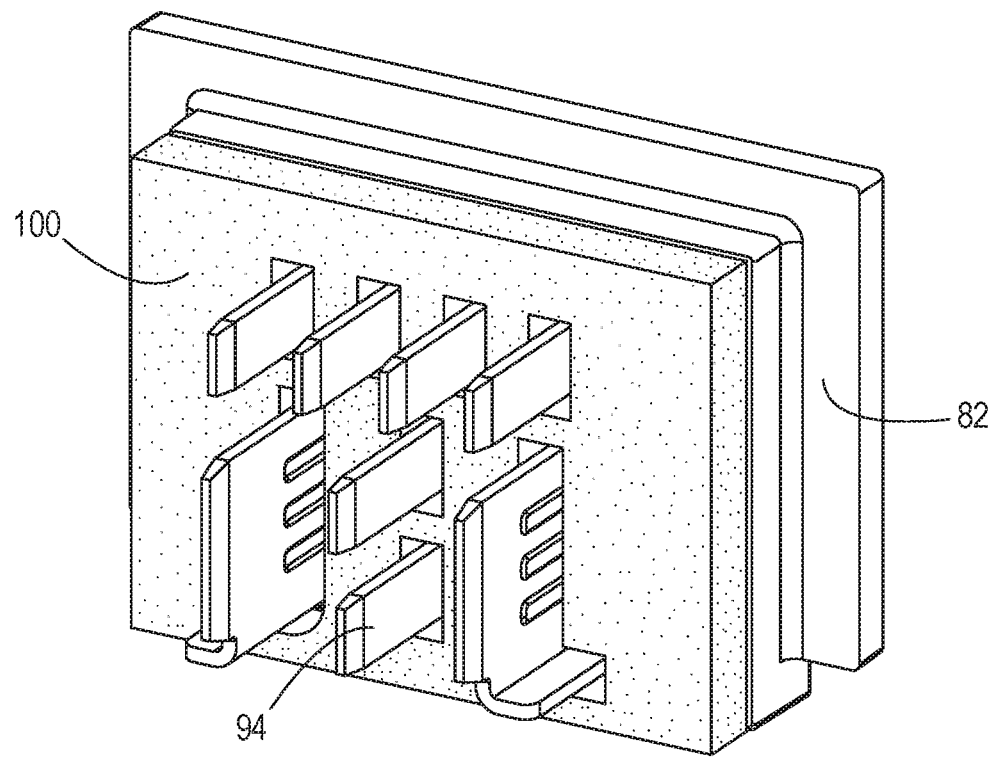
FIG. 4 is another perspective view the electric device terminals of FIG. 2.

As shown in FIG. 3, in one embodiment, at least a portion of the device contacts 94 include a coating 98 that is an insulator. In the illustrated embodiment, the insulator is a spray acrylic, but the insulator may have any suitable formulation. Additionally, and as shown in FIG. 4, in another embodiment, a tool gasket 100 is positioned against the end wall 82 and adjacent to and surrounding the device contacts 94. The gasket 100 compresses when a battery pack 54 is inserted.

With renewed reference to FIG. 2, the battery-receiving portion 50 includes stepped grooves 104 extending between the open end 86 and the end wall 82 (e.g., as illustrated, from the open end 86 to the end wall 82). The stepped grooves 104 are defined by rails 108 disposed on the sidewalls 78. The rails 108 protrude from the sidewalls 78 to define an upper extent of the grooves 104 that face the lower surface 74.

In the illustrated embodiment, the battery-receiving portion 50 also includes a latching mechanism 114 that protrudes from the lower surface 74 near the open end 86. The latching mechanism is coupled to an actuator 118. The latching mechanism 114 has a first position and a second position. The latching mechanism 114 is biased (i.e., by a spring or cam member, etc.) into the first position. In the first position, the latching mechanism 114 is configured to engage the battery pack 54 to maintain engagement between the battery pack 54 and the electrical device 10 within the battery-receiving portion 50. However, in other embodiments (not shown), the latching mechanism 114 may be disposed at various locations (e.g., on a sidewall 78, the end wall 82, the upper end wall 90, etc.) such that the latching mechanism 114 engages corresponding structure on the battery pack 54 to maintain engagement between the battery pack 54 and electrical device 10 and retain the battery pack 54 within the battery-receiving portion 50. In the second position, the latching mechanism 114 is positioned within the housing 40 such that the battery pack 54 is insertable into and removable from the cavity 70 without engaging with the latch mechanism 114. The actuator 118 is movable to move the latching mechanism 114 from the first position to the second position.

With further reference FIG. 2, an ejector 138 is supported on the end wall 90. The ejector 138 includes an ejection member 142 biased by a biasing member (e.g., one or more springs (not shown)) to protrude through the end wall 90. When the battery pack 54 is attached to the battery-receiving portion 50 of the housing 40, the ejection member 142 is pushed into the end wall 90 to compress the biasing member. From this position, the ejector 138 is configured to exert a force F on the battery pack 54 to push the battery pack 54 out of the battery-receiving portion 50 (e.g., upon release of the latching mechanism 114).

Figure 5:
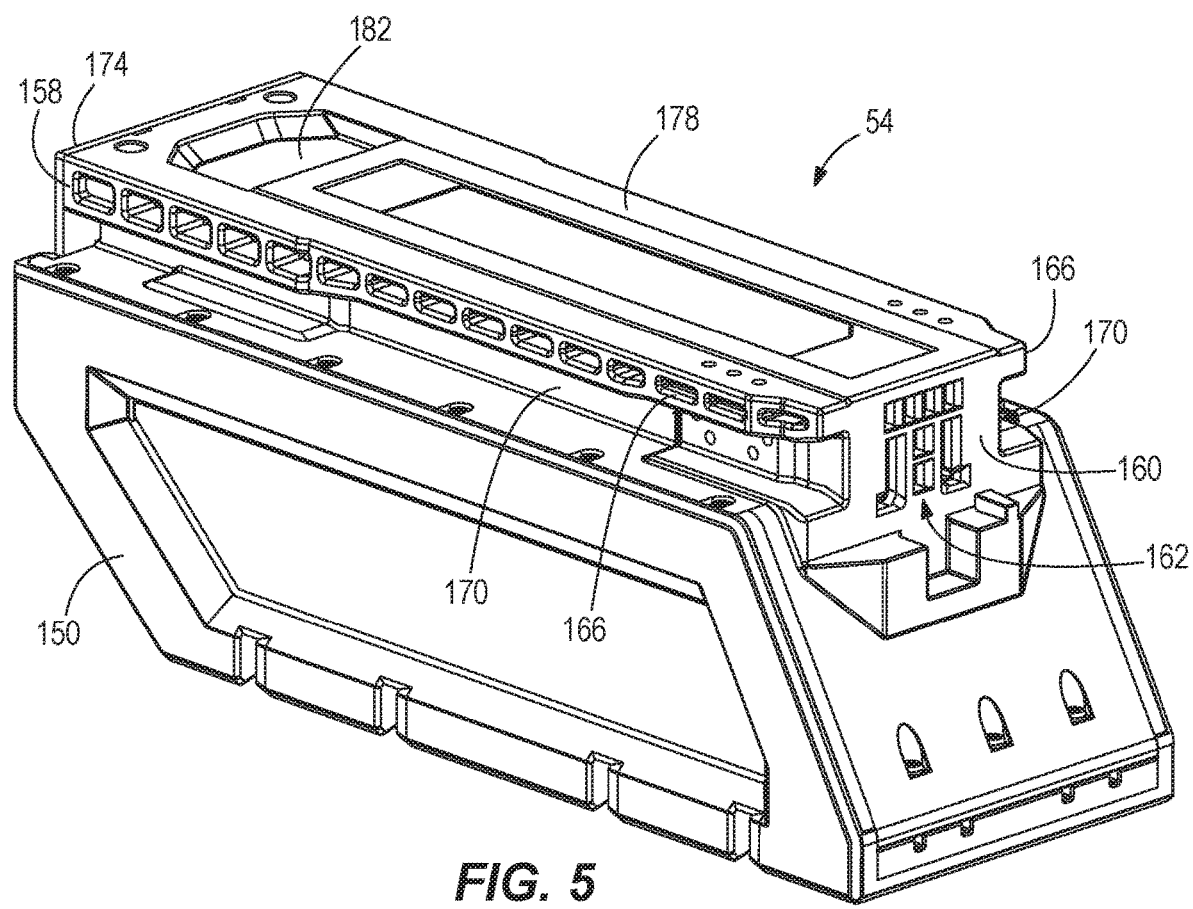
FIG. 5 is a perspective view of the battery pack shown in FIG. 1 including a housing.
Figure 9:
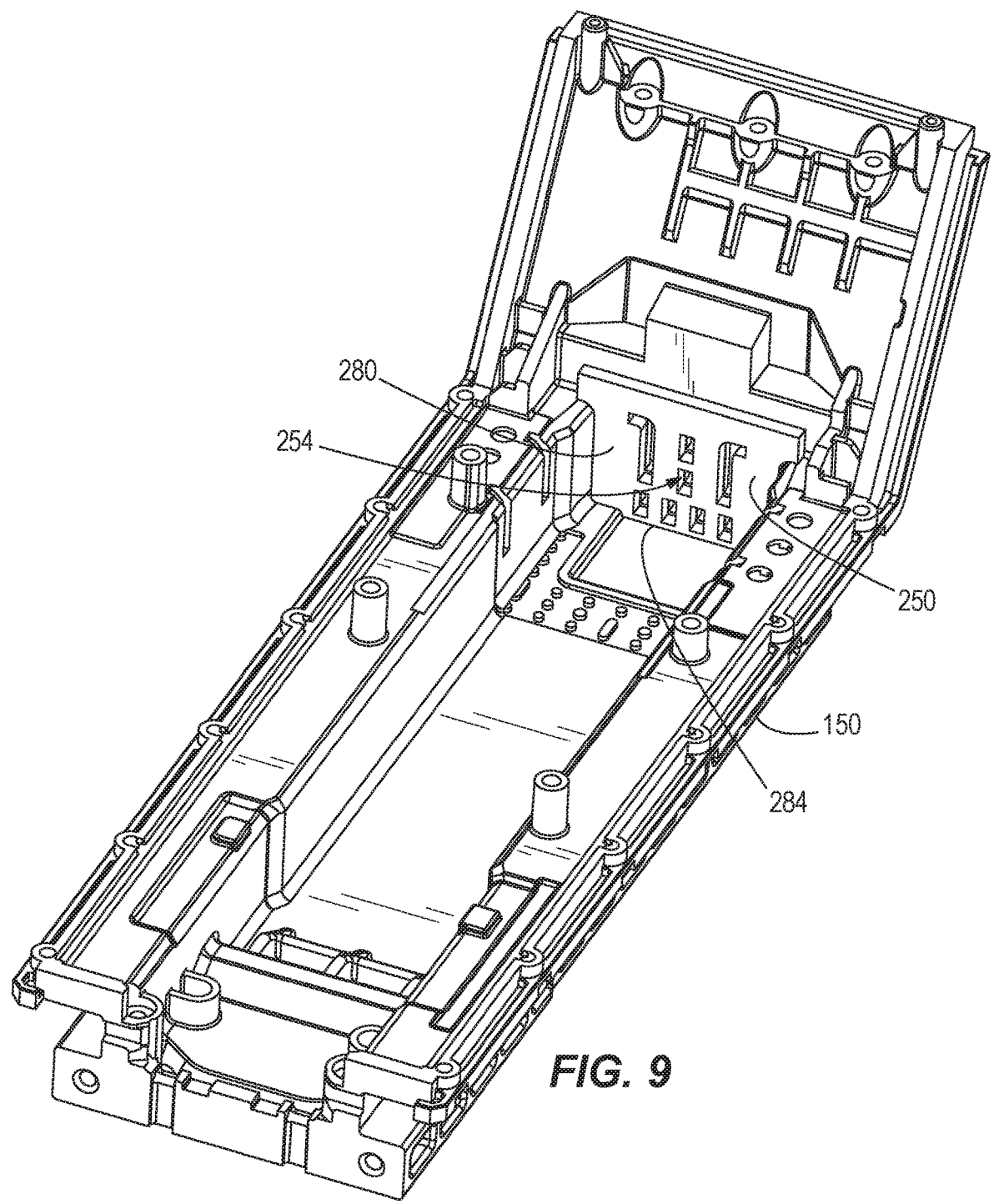
FIG. 9 is a perspective view of a portion of the housing of the battery pack and the first gasket.
Figure 10:
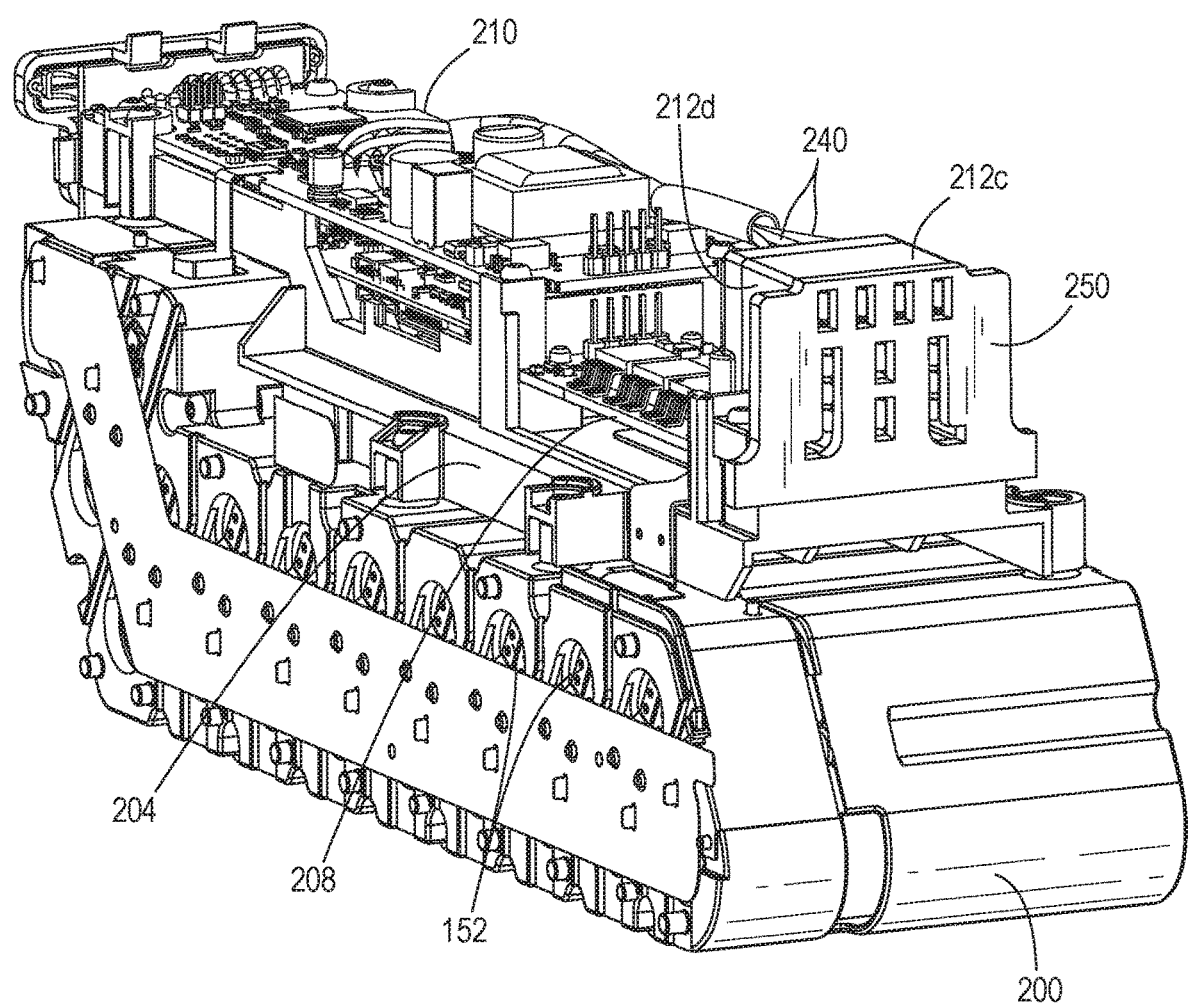
FIG. 10 is a perspective view of the battery pack of FIG. 5 with the housing removed, the battery pack including a first gasket.

FIGS. 5, 6, and 10 illustrate the battery pack 54 for use with the battery-receiving portion 50, described above. The battery pack 54 includes a housing 150 defining an internal cavity in which one or more battery cells 152 are supported. Each battery cell 152 may have a nominal voltage between about 3 V and about 5 V and may have a nominal capacity between about 2 Ah and about 6 Ah (in some cases, between about 3 Ah and about 5 Ah). The battery cells 152 may be any rechargeable battery cell chemistry type, such as, for example, lithium (Li), lithium-ion (Li-ion), other lithium-based chemistry, nickel-cadmium (NiCd), nickel-metal hydride (NiMH), etc.

The battery cells 152 may be connected in series, parallel, or combination series-parallel to provide the desired electrical characteristics (e.g., nominal voltage, current output, current capacity, power capacity, etc.) of the battery pack 54. The battery cells 152 are electrically coupled to battery pack contacts 154 (FIG. 11) supported on or within the housing 150 and configured to electrically and mechanically engage the device contacts 94 to facilitate the transfer of electrical power between the device 10 and the battery pack 54.

Figure 11:
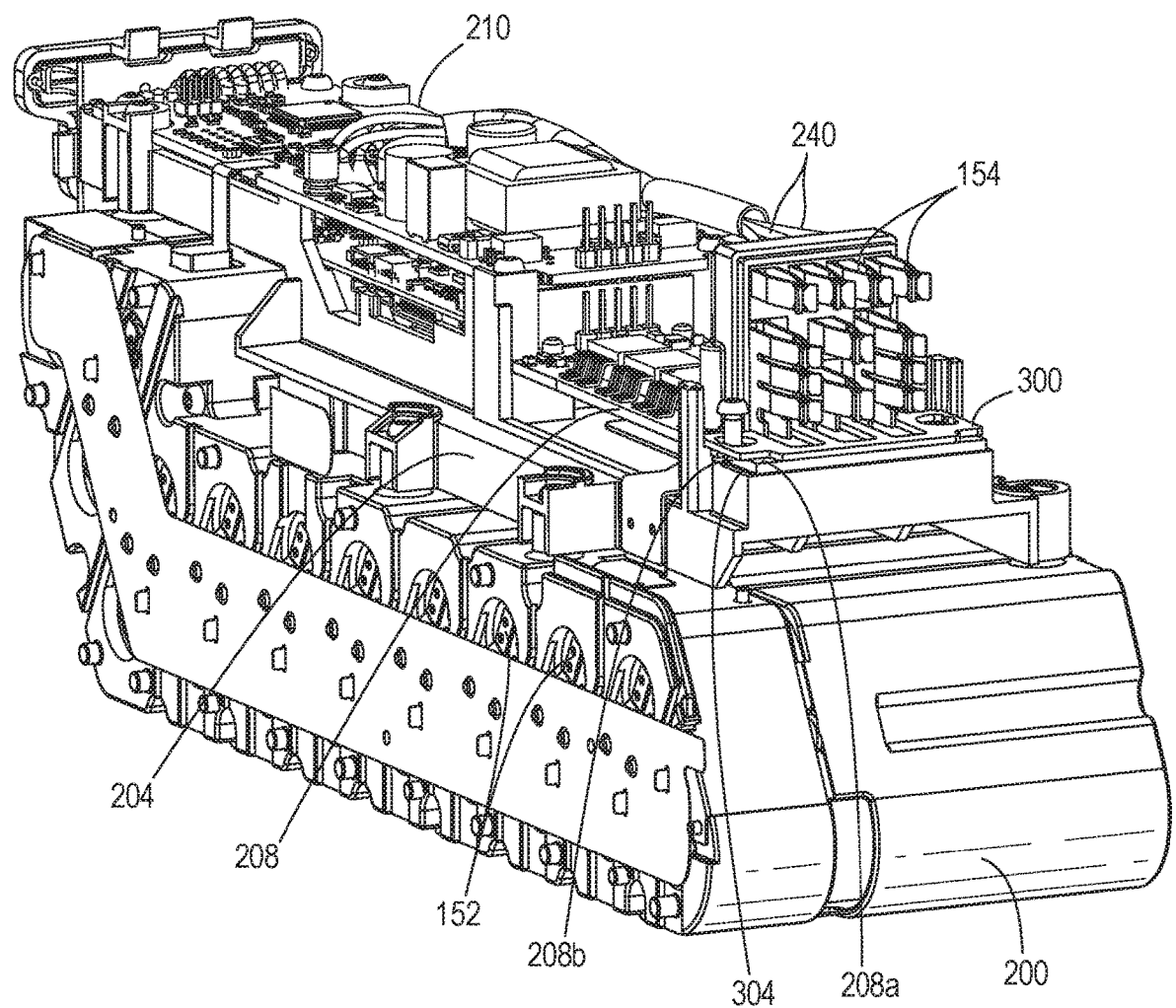
FIG. 11 is a perspective view of the battery pack of FIG. 5 with the housing, the first gasket, and a portion of the terminal block removed.

Further with respect to FIG. 5, the housing 150 includes a protrusion 158 supporting, at a front end 160, the battery pack contacts 154 (FIG. 11). In particular, the front end 160 includes a set of openings 162. Each of the openings 162 corresponds to one of the battery pack contacts 154. On each lateral side, a rail 166 extends laterally outwardly and to define a groove 170. Proximate a rear end 174, a top surface 178 defines a slot or recess 182 sized and shaped to cooperate with the latch mechanism 114.

The battery pack 54 is coupled to the battery-receiving portion 50 by aligning the rails 166 of the battery pack 54 with the grooves 58 of the battery-receiving portion 50, and subsequently sliding the battery pack 54 along a battery insertion axis 52 until the device contacts 94 engage the battery pack contacts 154.

It should be understood that, if the size and shape of the battery-receiving portion 50 is modified, corresponding variations in the size and shape of the battery pack 54 may be made. For example, the geometric configuration of the rails 108, 166 will be consistently varied in order to maintain the mating engagement between the battery pack 54 and the battery-receiving portion 50. It should be understood that, in other constructions (not shown), the orientation of the rails 108, 166 may be reversed with the rails 108 being directed outwardly and the rails 166 being directed inwardly.

Figure 12:
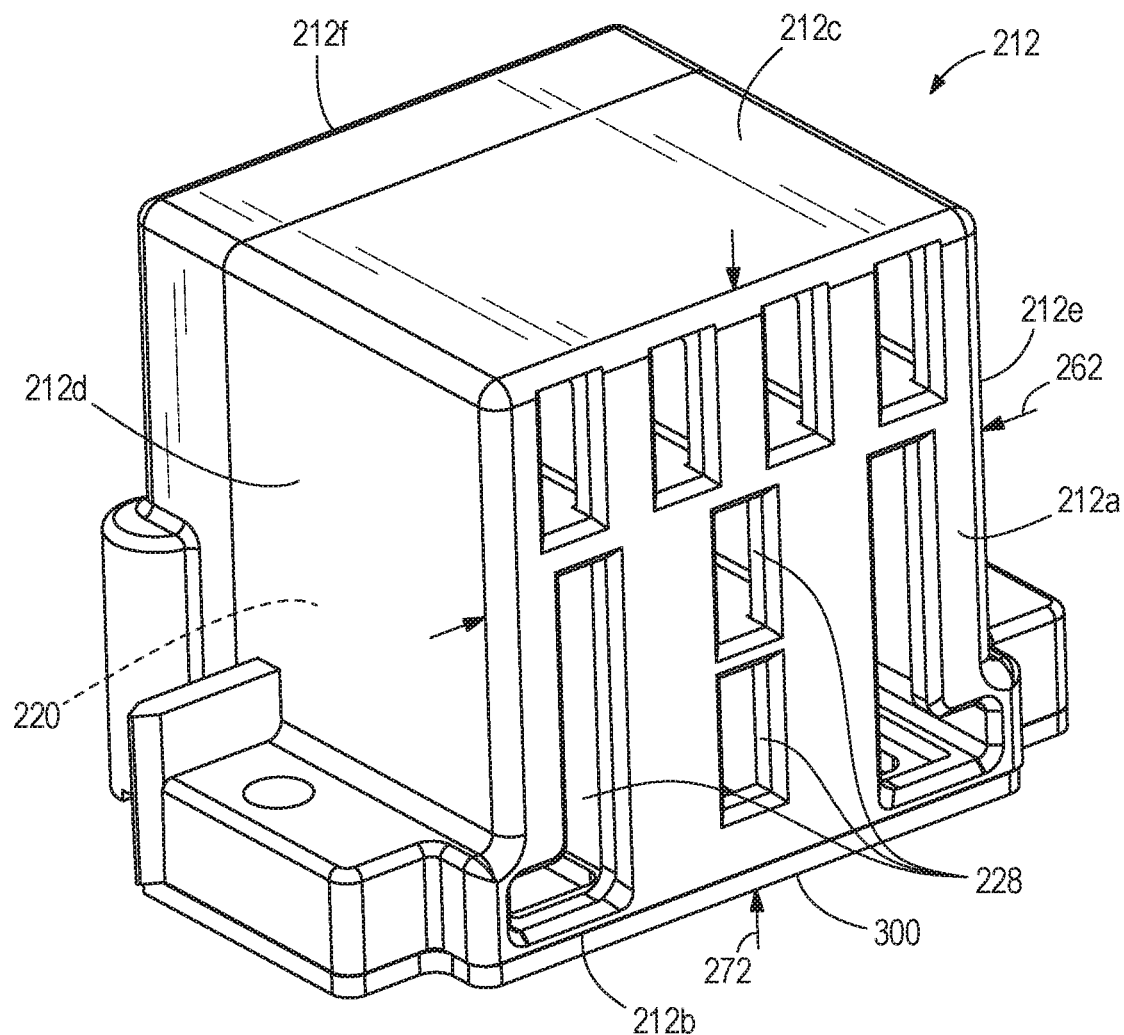
FIG. 12 is a perspective view of the terminal block and a second gasket.
Figure 13:
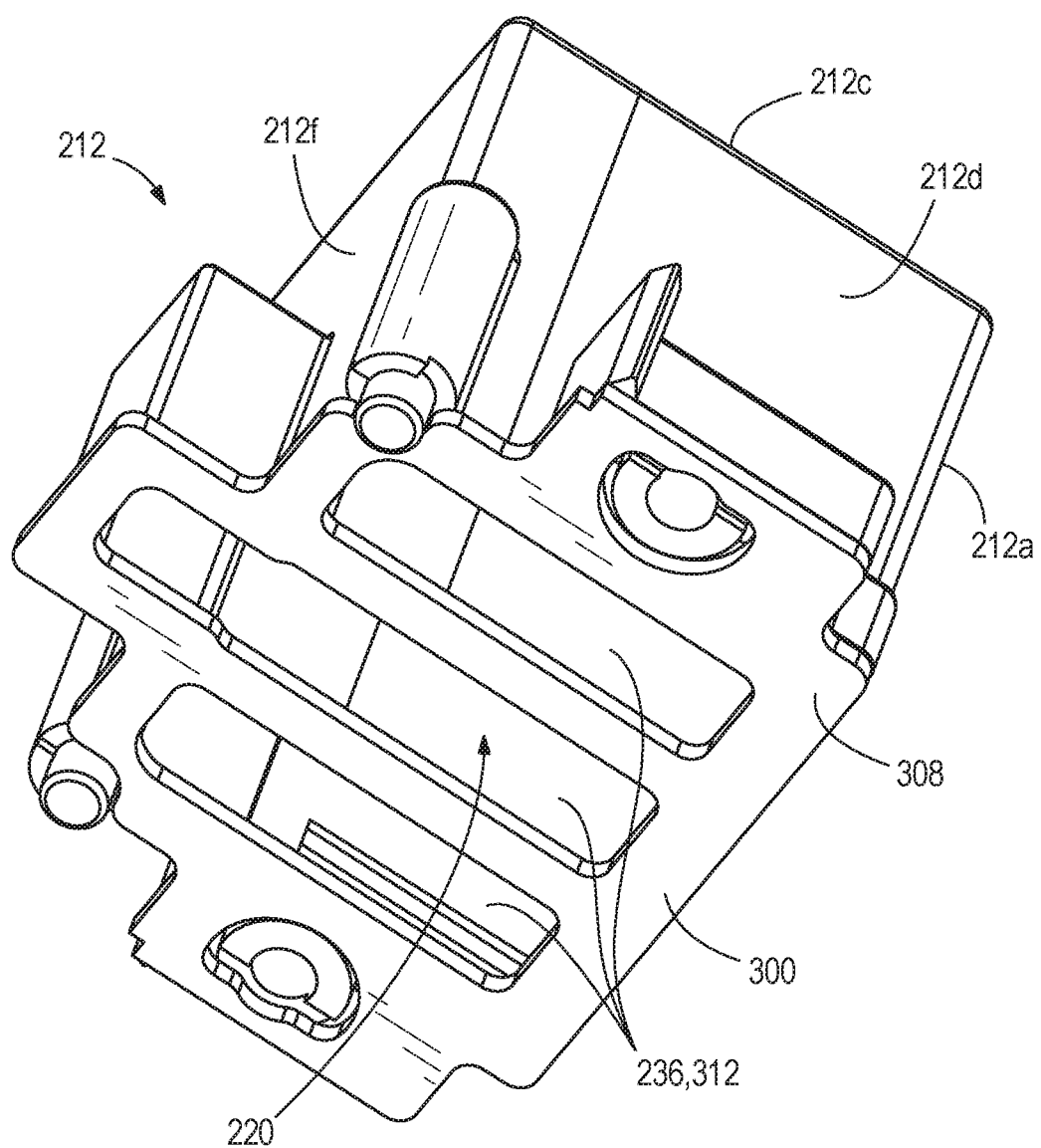
FIG. 13 is another perspective view of the terminal block and the second gasket.

As shown in FIGS. 6 and 10, positioned within the housing 150 is a battery cell holder 200, an auxiliary frame member 204, a first printed circuit board (PCB) 208, a second printed circuit board 210, and a terminal block 212 (FIGS. 12 and 13). As shown in FIG. 10, the battery cell holder 200 restrains the battery cells 152. The auxiliary frame member 204 is positioned on one side of the battery cell holder 200 within the housing 150. The battery cells 152 are in electrical communication with the first PCB 208. The first PCB 208 has a first surface 208a and a second surface 208b opposite the first surface 208a (FIG. 11), and the first PCB 208 is supported by the auxiliary frame member 204. The battery pack contacts 154 are coupled to, extend from, and are in communication with the first PCB 208. The terminal block 212 is supported by the first PCB 208 and encloses the battery pack contacts 154.

With respect to FIGS. 12 and 13, the terminal block 212 has a first wall 212a, a second wall 212b, a third wall 212c, a fourth wall 212d, a fifth wall 212e, and a sixth wall 212f. The six walls 212a-212f define an interior compartment 220 in which the battery pack contacts 154 are positioned. The first or front wall 212a has a first set of openings 228 that extend therethrough. Each of the openings 228 corresponds to one of the battery pack contacts 154. Accordingly, each of the first openings 228 is sized and shaped to receive the respective mating device contact 94. The second or bottom wall 212b has a second set of openings 236 that extend therethrough. The bottom wall 212b (and therefore the second openings 236) are positioned to face the first PCB 208, such that the battery pack contacts 154 extend from the first PCB 208 through the second plurality of openings 236 and into the interior 220 of the terminal block 212. The third or top wall 212c of the terminal block 212, the fourth wall 212d (e.g., first sidewall), fifth wall 212d (e.g., second sidewall), and the sixth or rear wall 212f are closed (i.e., have no openings). The four closed walls 212c-212f help prevent fluid and other debris from entering into the terminal block 212.

With respect to FIGS. 6-9, a first gasket 250 is positioned adjacent to the front wall 212a of the terminal block 212. That is, the first gasket 250 is positioned between and in contact with the terminal block 212 and the housing 150. The first gasket 250 includes openings 254, each of which corresponds to one of the openings 162 in the housing 150 of the battery pack and one of the first openings 228 in the terminal block 212. Moreover, each of the openings 254 corresponds to one of the battery pack contacts 154. Accordingly, each of the openings 254 is sized and shaped to receive the respective mating device contact 94. Each of the openings 254 in the first gasket 250 entirely surround the respective opening 228 in the terminal block 212. In the illustrated embodiment, the first gasket 250 covers and extends beyond an outer periphery of the first wall 212a of the terminal block 212. That is, the first gasket 250 has a greater width 258 than a width 262 (FIG. 12) of the terminal block 212 and a greater height 266 than a height 272 (FIG. 12) of the terminal block 212. More specifically, the first gasket 250 includes a first width 258a, a second width 258b that is greater than the first width 258a, and a third width 258c that is greater than the second width 258c. Each of the widths 258a-258c is greater than the width 262 of the terminal block 212. In other or additional embodiments, the first gasket 250 may have a smaller width 258 than the width 262 of the terminal block 212 and a smaller height 266 than the height 272 of the terminal block 212, as long as the first gasket 250 has a width and height sufficient to entirely surround the openings 228 in the terminal block 212.

Additionally, and with respect to FIG. 7, the first gasket 250 includes a first or front surface 276 that abuts a surface of the housing 150, a second or rear surface 280 that is opposite the front surface 276, and a third or top surface 284 that abuts another surface of the housing 150. The first width 258a corresponds to the top surface 284. The rear surface 280 of the first gasket 250 abuts both the front wall 212a of the terminal block 212 and at least a portion of the auxiliary frame member 204. A thickness 288 of the first gasket is defined between the front and rear surfaces 276, 280. The thickness 288 corresponds to and fills a gap (not shown) between the terminal block 212 and the housing 150. The gap is defined by a distance between the front wall 212a of the terminal block 212 and the housing 150. The first gasket 250 creates a seal between the openings 162 in the housing 150 and the openings 228 in the terminal block 212. Accordingly, the first gasket 250 prevents fluid and other debris from entering the housing 150 through the openings 162, and also prevents any fluid and debris that may be in the housing from entering into the terminal block 212. Moreover, the first gasket 250 acts as an anti-vibration mechanism by taking up the gap between the terminal block 212 and the housing 150. That is, the first gasket is configured to reduce vibration between the housing and the terminal block.

As shown in FIGS. 6 and 11-15, a second gasket 300 (FIGS. 11-13) is positioned adjacent the first surface 208a of the first PCB 208 and a third gasket 304 (FIGS. 14-15) is positioned adjacent the second surface 208b of the first PCB 208. In particular, the second gasket 300 is positioned between the terminal block 212 and the first surface 208a of the first PCB 208, while the third gasket 304 is positioned between the second surface 208b of the PCB 212 and the auxiliary frame member 204.

As shown in FIGS. 11-13, the second gasket 300 includes a body 308 with openings 312. Each of the openings 312 in the second gasket 300 corresponds to one of the second openings 236 in the bottom wall 212b of the terminal block 212. The second gasket 300 acts as a seal that prevents fluid or debris that may enter the terminal block 212 from reaching the first PCB 208, and prevents fluid and debris that may be in the housing from entering into the terminal block 212.

Figure 14:
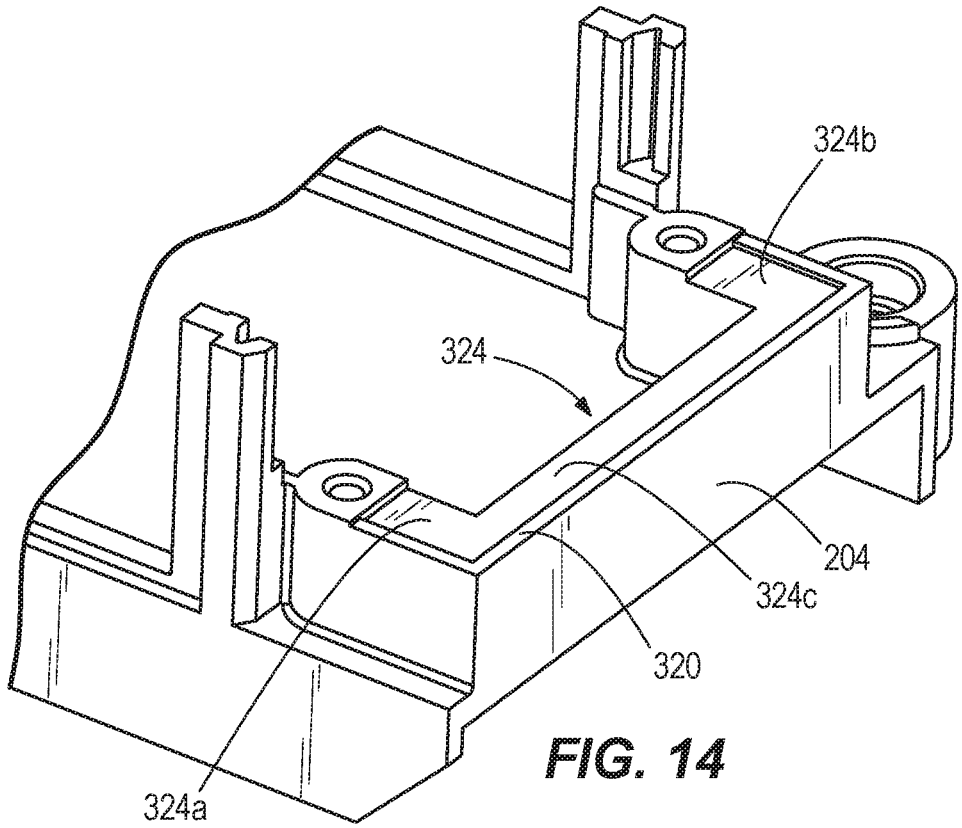
FIG. 14 is a perspective view of the auxiliary frame member.
Figure 15:
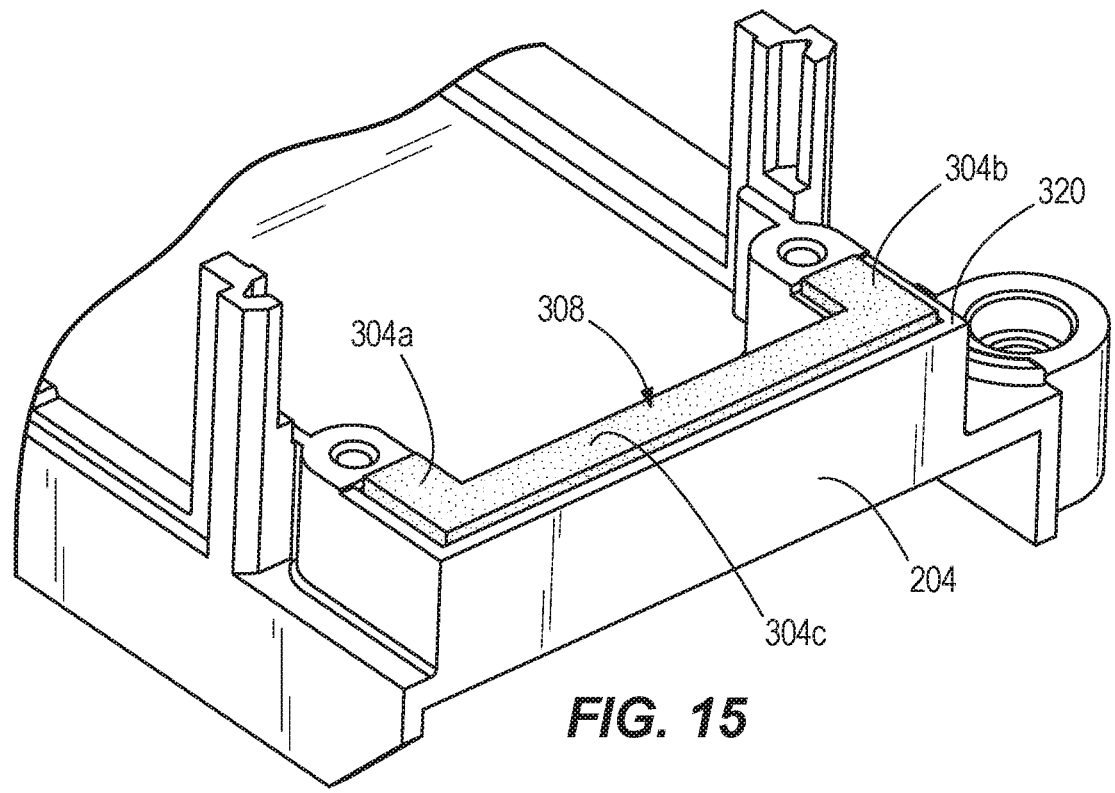
FIG. 15 is a perspective view of the auxiliary frame member with a third gasket.

As shown in FIGS. 14-15, the third gasket 304 is sized and shaped to conform to a lip 320 of the auxiliary frame member 204. In the embodiment of FIGS. 14-15, the third gasket 304 includes first and second leg portions 304a, 304b that extend from opposite sides of a central portion 304c. Moreover, the lip 320 of the auxiliary frame member includes a groove 324 that is sized and shaped to receive the third gasket 304. Accordingly, the groove 324 also includes first and second leg portions 324a, 324b that extend from opposite sides of a central portion 324c. The third gasket 304 keeps potting material (not shown) contained within the auxiliary frame member 204. The third gasket 304 may also act as an additional seal that prevents fluid or debris that may enter the terminal block 212 from reaching the first PCB 208, and prevents fluid and debris that may be in the housing from entering into the terminal block 212.

In the illustrated embodiment, each of the gaskets 250, 300, 304 are constructed of foam. In other embodiments, each of the gaskets 250, 300, 304 may be constructed from any suitable material, and the material need not be the same for each.

In the illustrated embodiment, together, the gaskets 250, 300, 304 eliminate space between various structures contained in the battery pack 54. That is, the gaskets 250, 300 prevent the egress of fluid and debris into the housing 150. Moreover, the gaskets 250, 300 also prevent fluid and debris that are able to enter the housing 150 from reaching the first PCB 208 and other electrical components contained within the housing 150 of the battery pack 54. Similarly, the first and second gaskets 250, 300 also prevent any fluid and debris that may be in the housing from entering into the terminal block 212. The third gasket 304 helps contain the potting compound within the battery pack 54, as discussed above.

Although the invention has been described in detail with reference to certain preferred embodiments, variations and modifications exist within the scope and spirit of one or more independent aspects of the invention as described.

What is claimed is:

1. A power tool system comprising:
    a power tool including
        a power tool housing including a battery-receiving portion that removably receives a battery pack, and
        device contacts supported by the power tool housing, the device contacts configured to mechanically and electrically interface with the battery pack; and
    the battery pack including
        a battery pack housing having an internal cavity in which one or more battery cells are supported, the battery pack housing having a set of openings,
        a frame member positioned within the battery pack housing;
        a printed circuit board supported within the battery pack housing by the frame member, the one or more battery cells being in electrical communication with the printed circuit board,
        battery pack contacts coupled to and in electrical communication with the printed circuit board, each of the battery pack contacts being accessible through one of the set of openings in the battery pack housing,
        a terminal block supported by the printed circuit board and enclosing the battery pack contacts, the battery pack contacts being accessible through a first wall of the terminal block,
        a first gasket positioned between the first wall of the terminal block and the battery pack housing, the first gasket having a surface that abuts the first wall and at least a portion of the frame member, and
        a second gasket positioned between a second wall of the terminal block and the printed circuit board.

2. The power tool system of claim 1, wherein a coating covers at least a portion of each of the device contacts, the coating being an insulator.

3. The power tool system of claim 2, wherein the coating is a spray acrylic.

4. The power tool system of claim 1, wherein the first gasket includes a first set of openings and the second gasket includes a second set of openings, each of the first set of openings corresponding to an opening in the first wall of the terminal block and each of the second set of openings corresponding to an opening in the second wall of the terminal block.

5. The power tool system of claim 1, wherein the first gasket and the second gasket prevent fluid and debris from entering the terminal block.

6. A battery pack for use with a power tool, the battery pack comprising:
    a housing having an internal cavity in which one or more battery cells are supported, the housing having a set of openings;
    a printed circuit board supported within the housing, the one or more battery cells being in electrical communication with the printed circuit board;
    battery pack contacts coupled to and in electrical communication with the printed circuit board, each of the battery pack contacts being accessible through one of the set of openings in the housing;
    a terminal block supported by the printed circuit board and enclosing the battery pack contacts, the terminal block including a wall having a set of openings, each of the set of openings in the wall corresponding to one of the set of openings in the housing; and
    a gasket positioned between the wall of the terminal block and the housing, the gasket including a set of openings, each of the set of openings in the gasket corresponding to one of the set of openings in the housing and one of the set of openings in the terminal block.

7. The battery pack of claim 6, wherein the gasket prevents fluid and debris from entering the set of openings in the housing and the set of openings in the terminal block.

8. The battery pack of claim 6, wherein a thickness of the gasket corresponds to a distance between the wall of the terminal block and the housing, the gasket configured to reduce vibration between the housing and the terminal block.

9. The battery pack of claim 6, wherein the gasket is a first gasket and wherein a second gasket is positioned between the printed circuit board and the terminal block, the second gasket preventing fluid and debris from entering the terminal block.

10. The battery pack of claim 9, wherein the wall is a first wall and the second gasket includes a set of openings, each of the set of openings of the second gasket corresponding an opening in a second wall of the terminal block.

11. The battery pack of claim 6, wherein the gasket covers and extends beyond an outer periphery of the wall of the terminal block.

12. The battery pack of claim 6, wherein each of the set of openings in the gasket entirely surrounds the one of the set of openings in the terminal block.

13. The battery pack of claim 6, wherein the gasket includes a first surface that abuts a first surface of the housing and a second surface that abuts a second surface of the housing.

14. The battery pack of claim 6, further comprising a frame member positioned within the housing and configured to support the printed circuit board.

15. The battery pack of claim 14, wherein the gasket includes a first surface that abuts a first surface of the housing and a second surface that is opposite the first surface, the second surface abutting the wall of the terminal block and a portion of the frame member.

16. A battery pack for use with a power tool, the battery pack comprising:
    a housing having an internal cavity in which one or more battery cells are supported, the housing having a set of openings;
    a printed circuit board supported within the housing, the one or more battery cells being in electrical communication with the printed circuit board;

battery pack contacts coupled to and in electrical communication with the printed circuit board;

a terminal block supported by the printed circuit board and enclosing the battery pack contacts, the terminal block including a set of openings, each of the battery pack contacts being accessible through one of the set of openings in the housing and one of the set of openings in the terminal block;

a first gasket positioned between a first wall of the terminal block and the housing, the first gasket including a first surface, a second surface that is opposite the first surface, and a third surface, the first surface being in contact with a first surface of the housing, the second surface being in contact with the first wall of the terminal block, the third surface being in contact with a second surface of the housing; and a second gasket positioned between a second wall of the terminal block and the printed circuit board.

17. The battery pack of claim 16, wherein the first gasket covers and extends beyond an outer periphery of the first wall of the terminal block.

18. The battery pack of claim 16, wherein the first gasket includes a set of openings, and wherein each of the set of openings in the first gasket entirely surrounds one of the set of openings in the terminal block.

19. The battery pack of claim 16, wherein the first gasket includes a first set of openings and the second gasket includes a second set of openings, each of the first set of openings corresponding to one of the set of openings in of the terminal block and each of the second set of openings corresponding to an opening in the second wall of the terminal block.

20. The battery pack of claim 16, wherein each of the first gasket and the second gasket prevent water and debris from entering the terminal block.

* * * * *